(12) United States Patent
Yang et al.

(10) Patent No.: US 11,194,965 B2
(45) Date of Patent: Dec. 7, 2021

(54) KEYWORD EXTRACTION METHOD AND APPARATUS, STORAGE MEDIUM, AND ELECTRONIC APPARATUS

(71) Applicant: TENCENT TECHNOLOGY (SHENZHEN) COMPANY LIMITED, Shenzhen (CN)

(72) Inventors: Zhengwei Yang, Shenzhen (CN); Huang Tang, Shenzhen (CN); Xiaopeng Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 251 days.

(21) Appl. No.: 16/682,552

(22) Filed: Nov. 13, 2019

(65) Prior Publication Data

US 2020/0081977 A1 Mar. 12, 2020

Related U.S. Application Data

(63) Continuation of application No. PCT/CN2018/108726, filed on Sep. 29, 2018.

(30) Foreign Application Priority Data

Oct. 20, 2017 (CN) .......................... 201710991231.7

(51) Int. Cl.
*G06F 40/279* (2020.01)
*G06F 16/31* (2019.01)
(Continued)

(52) U.S. Cl.
CPC .......... *G06F 40/279* (2020.01); *G06F 16/313* (2019.01); *G06F 16/3346* (2019.01); *G06F 40/253* (2020.01)

(58) Field of Classification Search
CPC .... G06F 40/30; G06F 3/0237; G06F 16/3344; G06F 40/205; G06F 16/35;
(Continued)

(56) References Cited

U.S. PATENT DOCUMENTS 7,467,079 B2 * 12/2008 Morimoto ............. G06F 40/279
704/9
8,589,159 B2 * 11/2013 Morisaki ................. G10L 15/26
704/235

(Continued)

FOREIGN PATENT DOCUMENTS

CN 103389979 A 11/2013
CN 103473317 A 12/2013
(Continued)

OTHER PUBLICATIONS

International Search Report dated Dec. 24, 2018 filed Sep. 29, 2018. (With English Translation ) p. 1-5.
(Continued)

*Primary Examiner* — Linda Wong
(74) *Attorney, Agent, or Firm* — Oblon, McClelland, Maier & Neustadt, L.L.P.

(57) ABSTRACT

A keyword extraction method is provided. In the method, a candidate keyword set in a target text is obtained by processing circuitry of a server. An extraction degree of the candidate keyword is determined by the processing circuitry based on subject similarity and a text conversion frequency of a candidate keyword in the candidate keyword set. The subject similarity is between the candidate keyword and the target text. The extraction degree indicates a probability at which the candidate keyword used as a keyword matching the target text is extracted. The keyword is extracted by the processing circuitry from the candidate keyword set according to the extraction degree.

20 Claims, 4 Drawing Sheets

(51) Int. Cl.
*G06F 16/33* (2019.01)
*G06F 40/253* (2020.01)

(58) Field of Classification Search
CPC .. G06F 16/7844; G06F 40/40; G06F 16/3329; G06F 16/3334; G06F 16/355; G06F 40/00; G06F 40/10; G06F 40/20; G06F 40/237; G06F 40/279; G06F 40/284; G06F 16/90332; G06F 40/44; G06F 40/56; G06N 20/00; G10L 15/005; G10L 15/22; G10L 13/08; G10L 13/00; G10L 15/00; G10L 15/02; G10L 15/1815

See application file for complete search history.

(56) References Cited

U.S. PATENT DOCUMENTS

| | | | | |
|---|---|---|---|---|
| 10,387,568 | B1* | 8/2019 | Cheng | G06F 16/24578 |
| 10,404,806 | B2* | 9/2019 | Biswas | H04L 67/142 |
| 2005/0171778 | A1* | 8/2005 | Sasaki | G10L 13/08 |
| | | | | 704/269 |
| 2006/0100856 | A1* | 5/2006 | Kang | G06F 40/242 |
| | | | | 704/9 |
| 2006/0271527 | A1* | 11/2006 | Kutsumi | G06F 40/242 |
| 2007/0016571 | A1* | 1/2007 | Assadian | G06F 40/247 |
| 2007/0192310 | A1* | 8/2007 | Takagi | G06F 16/48 |
| 2008/0195595 | A1* | 8/2008 | Masuyama | G06F 16/313 |
| 2010/0010803 | A1* | 1/2010 | Ishikawa | G06F 40/247 |
| | | | | 704/9 |
| 2010/0077003 | A1* | 3/2010 | Kondo | G06F 16/5838 |
| | | | | 707/780 |
| 2010/0332503 | A1 | 12/2010 | Buckley et al. | |
| 2011/0161071 | A1* | 6/2011 | Duong-van | G06F 40/30 |
| | | | | 704/9 |
| 2011/0167066 | A1* | 7/2011 | Picault | G06Q 10/06 |
| | | | | 707/737 |
| 2011/0191345 | A1* | 8/2011 | Young | G06F 16/355 |
| | | | | 707/739 |
| 2011/0264444 | A1* | 10/2011 | Morisaki | G06F 40/35 |
| | | | | 704/9 |
| 2012/0072937 | A1* | 3/2012 | Ikeda | H04N 21/4126 |
| | | | | 725/10 |
| 2013/0183022 | A1* | 7/2013 | Suzuki | G06K 9/00718 |
| | | | | 386/241 |
| 2014/0101162 | A1* | 4/2014 | Hsueh | G06F 16/313 |
| | | | | 707/739 |
| 2014/0278359 | A1* | 9/2014 | Speer | G06F 40/30 |
| | | | | 704/9 |
| 2015/0254565 | A1* | 9/2015 | Beigman Klebanov | |
| | | | | G06N 7/005 |
| | | | | 706/12 |
| 2016/0203147 | A1* | 7/2016 | Ikeda | G06F 16/00 |
| | | | | 715/234 |
| 2017/0083484 | A1* | 3/2017 | Patil | G06F 16/686 |
| 2017/0109272 | A1* | 4/2017 | Km | G06F 11/3692 |
| 2017/0132311 | A1* | 5/2017 | Balinsky | G06F 16/353 |
| 2017/0139899 | A1* | 5/2017 | Zhao | G06F 40/284 |
| 2017/0192959 | A1* | 7/2017 | Lee | G06F 16/313 |
| 2018/0060699 | A1* | 3/2018 | Ghazali | G06K 9/628 |
| 2018/0108354 | A1* | 4/2018 | Negi | G10L 15/26 |
| 2018/0276294 | A1* | 9/2018 | Takemoto | G06F 16/3331 |
| 2018/0276302 | A1* | 9/2018 | Talyansky | G06F 16/9535 |
| 2018/0300335 | A1* | 10/2018 | Drochomirecki | G06F 16/48 |
| 2018/0365216 | A1* | 12/2018 | Kao | G06F 16/3329 |
| 2019/0034080 | A1* | 1/2019 | Nagel | G06F 3/04886 |

FOREIGN PATENT DOCUMENTS

| | | |
|---|---|---|
| CN | 103744835 A | 4/2014 |
| CN | 104239300 A | 12/2014 |
| CN | 104778161 | 7/2015 |
| CN | 105426535 A | 3/2016 |
| CN | 105574091 A | 5/2016 |
| CN | 105893410 | 8/2016 |
| CN | 108334533 | 7/2018 |

OTHER PUBLICATIONS

Written Opinion dated Dec. 24, 2018 filed Sep. 29, 2018. p. 1-4.
Liu, Zhiyuan, "Research on Keyword Extraction Using Document Topical Structure", Mar. 2011, Tsinghua University, p. 1-130.
Li, Jingyue, et al., "An Improved TFIDF-Based Approach to Extract Key Words from Web Pages", Computer Applications and Software, May 2011, p. 1-3.
Chinese Office Action dated Mar. 29, 2021 in Application No. 201710991231.7, with concise English translation. (13 pages).
Office Action dated Jul. 23, 2021 issued in corresponding Chinese patent application No. 201710991231.7 with English translation 13 pages.

* cited by examiner

KEYWORD EXTRACTION METHOD AND APPARATUS, STORAGE MEDIUM, AND ELECTRONIC APPARATUS

RELATED APPLICATION

This application is a continuation of International Application No. PCT/CN2018/108726, filed on Sep. 29, 2018, which claims priority to Chinese Patent Application No. 201710991231.7, entitled "KEYWORD EXTRACTION METHOD AND APPARATUS, STORAGE MEDIUM, AND ELECTRONIC APPARATUS", filed on Oct. 20, 2017. The entire disclosures of the prior applications are hereby incorporated by reference in their entirety.

FIELD OF THE TECHNOLOGY

This application relates to keyword extraction.

BACKGROUND OF THE DISCLOSURE

Keywords are index words of key content in current documents and usually used for retrieving and positioning the key content in a search process, to quickly learn and grasp entire content of the documents, to implement processes of performing text document classification, data analysis, and intelligent matching and recommendation according to the keywords.

However, common keyword extraction methods in the related technology are usually based on statistical data, and general words are broadly extracted, that is, the keyword extraction methods provided in the related technology have a problem of low accuracy.

For the foregoing problem, no effective solution has been provided at present.

SUMMARY

Embodiments of this application provide a keyword extraction method and apparatus, a non-transitory computer-readable storage medium, and an electronic apparatus, to resolve at least a technical problem of low extraction accuracy caused by directly performing broad keyword extraction on general words.

According to an aspect of the embodiments of this application, a keyword extraction method is provided. In the method, a candidate keyword set in a target text is obtained by processing circuitry of a server. An extraction degree of the candidate keyword is determined by the processing circuitry based on subject similarity and a text conversion frequency of a candidate keyword in the candidate keyword set. The subject similarity is between the candidate keyword and the target text. The extraction degree indicates a probability at which the candidate keyword used as a keyword matching the target text is extracted. The keyword is extracted by the processing circuitry from the candidate keyword set according to the extraction degree.

According to an aspect of the determining, the subject similarity of the candidate keyword and a weighting result of the text conversion frequency of the candidate keyword are obtained by the processing circuitry. Attribute information of the candidate keyword is obtained by the processing circuitry. The attribute information includes a part of speech of the candidate keyword and a word frequency of the candidate keyword in the target text. Thee extraction degree is determined by the processing circuitry according to the weighting result and the attribute information.

According to an aspect of the determining, an extraction coefficient of the candidate keyword is determined by the processing circuitry according to the part of speech of the candidate keyword and a location of the candidate keyword in the target text. A product of the extraction coefficient is obtained by the processing circuitry, the word frequency, and the weighting result as the extraction degree, a sum of a first weight matching the subject similarity and a second weight matching the text conversion frequency in the weighting result being 1.

According to an aspect, the determining includes determining, by the processing circuitry, that the extraction coefficient is greater than a part-of-speech coefficient matching the part of speech in a case that the candidate keyword appears in a title corresponding to the target text. The determining further includes determining, by the processing circuitry, that the extraction coefficient is equal to the part-of-speech coefficient matching the part of speech in a case that the candidate keyword does not appear in a title corresponding to the target text. A value of the part-of-speech coefficient is determined according to the part of speech of the candidate keyword, the part-of-speech coefficient being a first value in a case that the part of speech is a noun, the part-of-speech coefficient being a second value in a case that the part of speech is a verb, and the part-of-speech coefficient being a third value in a case that the part of speech is a word of another part of speech.

According to an aspect, in the method before the determining, a total quantity of texts in a corpus in which the target text is located and a first ratio of the total quantity of texts to a quantity of texts including the candidate keyword in the corpus are obtained by the processing circuitry. A total quantity of search entries in a preset search platform and a quantity of search entries including the candidate keyword in the preset search platform are obtained by the processing circuitry. A second ratio of the quantity of search entries to the total quantity of search entries is determined by the processing circuitry according to the quantity of search entries and the total quantity of search entries. Logarithm computing on a product of the first ratio and the second ratio is performed by the processing circuitry, to obtain the text conversion frequency of the candidate keyword.

According to an aspect, in the method before the determining, first subject distribution data matching the candidate keyword is obtained by the processing circuitry. The first subject distribution data indicates a probability at which the candidate keyword is a kth subject in K subjects. Second subject distribution data matching the target text is obtained by the processing circuitry. The second subject distribution data indicates a probability at which the target text is the kth subject in the K subjects. The subject similarity between the candidate keyword and the target text is determined by the processing circuitry according to the first subject distribution data and the second subject distribution data. The subject similarity indicates a probability at which the candidate keyword is the kth subject, and the target text is also the kth subject in the K subjects, k being greater than or equal to 1 and less than or equal to K.

According to an aspect, a text label for the target text is matched by the processing circuitry according to the extracted keyword. The text label is used for identifying classification information of the target text. The target text is pushed to a matching user account according to the text label.

According to an aspect, an account label for a target account obtaining the target text is matched by the processing circuitry according to the extracted keyword. The account label is used for identifying classification information of the target account. A matching text is pushed to the target account according to the account label.

According to an aspect of the embodiments of this application, a non-transitory computer-readable storage medium is provided. The storage medium stores instructions which when executed by a processor cause the processor to perform any of the keyword extraction methods.

According to aspects of the embodiments of this application, keyword extraction apparatus and an electronic apparatus are further provided. The keyword extraction apparatus and electronic apparatus can be configured to perform any of the keyword extraction methods. The electronic apparatus includes, for example, a memory, a processor, and a computer program that is stored on the memory and that can be run on the processor, the processor performing the method by using the computer program.

In the embodiments of this application, a method of obtaining, by a server, a candidate keyword set in a target text, and then determining an extraction degree of the keyword in the keyword set according to subject similarity and a text conversion frequency of a candidate keyword in the candidate keyword set is used, the subject similarity being similarity between the candidate keyword and the target text, to extract the keyword from the candidate keyword set by using the extraction degree, to combine at least two dimensions of the text conversion frequency of the candidate keyword and the subject similarity of the target text, to determine a to-be-extracted keyword in the target text, rather than performing broad keyword extraction based on statistical data, thereby improving keyword extraction accuracy.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the figures.

DESCRIPTION OF EMBODIMENTS

To make a person skilled in the art better understand solutions of this application, the following describes the technical solutions in the embodiments of this application with reference to the accompanying drawings in the embodiments of this application. The described embodiments are merely some rather than all of the embodiments of this application. All other embodiments obtained by persons skilled in the art based on the embodiments of the present application shall fall within the protection scope of the present application.

It should be noted that in the specification, claims, and accompanying drawings of this application, the terms "first", "second", and so on are intended to distinguish between similar objects rather than indicating a specific order. It should be understood that the data termed in such a way are interchangeable in proper circumstances, so that the embodiments of this application described herein can be implemented in other orders than the order illustrated or described herein. Moreover, the terms "include", "contain" and any other variants mean to cover the non-exclusive inclusion. For example, a process, method, system, product, or device that includes a series of steps or units is not necessarily limited to those steps or units that are expressly listed, but may include other steps or units not expressly listed or inherent to such a process, method, product, or device.

The embodiments of this application provide a keyword extraction method. Before the technical solutions of the embodiments of this application are described, an application scenario of the embodiments of this application is first described. The technical solutions of the embodiments of this application are applied to extraction of keywords in text data.

Figure 1:
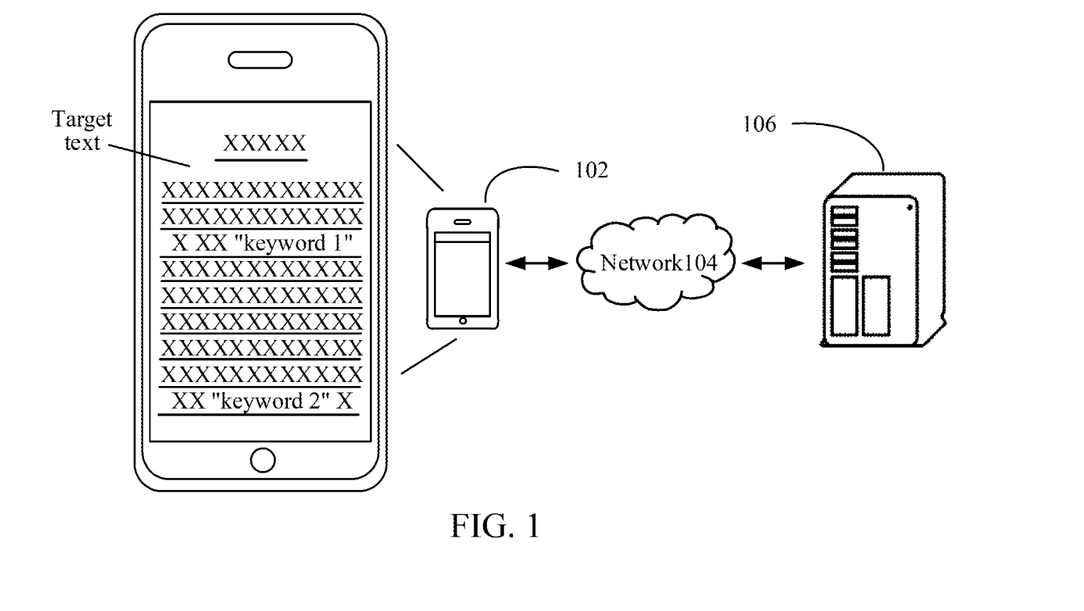
FIG. 1 is a schematic diagram of display of text data in an optional electronic terminal according to an embodiment of this application.

As shown in FIG. 1, FIG. 1 is a schematic diagram of an application environment of a keyword extraction method according to an embodiment of this application. A terminal 102 is connected to a server 106 through a network 104, a terminal application is provided in the terminal 102 and is used for displaying a target text in a display screen of the terminal 102. A candidate keyword set in the target text is obtained from the terminal 102. The server 106 determines an extraction degree of a keyword in a keyword set at least according to subject similarity and a text conversion frequency of a candidate keyword in the candidate keyword set, the subject similarity being similarity between the candidate keyword and the target text, and the extraction degree being used for indicating a probability at which the candidate keyword used as a keyword matching the target text is extracted. The server 106 extracts the keyword from the candidate keyword set according to the extraction degree.

In the embodiments of this application, a server obtains a candidate keyword set in a target text, and then determines an extraction degree of the keyword in the keyword set according to subject similarity and a text conversion frequency of a candidate keyword in the candidate keyword set is used, the subject similarity being similarity between the candidate keyword and the target text, to extract the keyword from the candidate keyword set by using the extraction degree, to combine at least two dimensions of the text conversion frequency of the candidate keyword and the subject similarity of the target text, to determine a to-be-extracted keyword in the target text, rather than performing broad keyword extraction based on statistical data, thereby improving keyword extraction accuracy.

The terminal includes but is not limited to: a mobile terminal, a PC, and the like, and the terminal has a memory and a display screen, to store text data of the terminal, display the text data, and the like. For ease of description, the text data is described as the target text below, and the text data and the target text have a same meaning.

Figure 2:
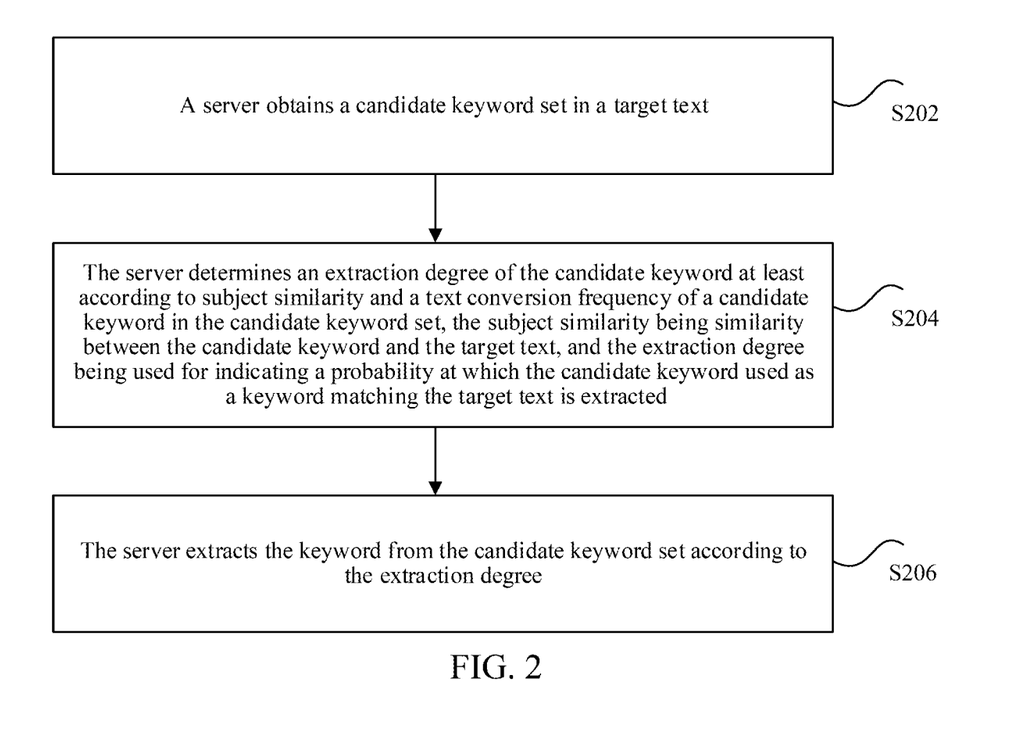
FIG. 2 is a schematic flowchart of a keyword extraction method according to an embodiment of this application.

According to the embodiments of this application, a keyword extraction method is provided. As shown in FIG. 2, the method includes is steps as follows In step S202, a server obtains a candidate keyword set in a target text.

In step S204, the server determines an extraction degree of the candidate keyword at least according to subject similarity and a text conversion frequency of a candidate keyword in the candidate keyword set, the subject similarity being similarity between the candidate keyword and the target text, and the extraction degree being used for indicating a probability at which the candidate keyword used as a keyword matching the target text is extracted.

In step S206, the server extracts the keyword from the candidate keyword set according to the extraction degree.

The application scenario in the technical solutions of the embodiments of this application includes but is not limited to: an electronic terminal, a server, or the like, which is configured to obtain the keyword in the target text, retrieve a target keyword, or the like, and may be specifically used in an application scenario such as advertisement pushing, news pushing, and other message notification subscribed by a user. The foregoing application scenario is only an example. This is not limited in this embodiment.

Optionally, in a process of obtaining the keyword, first the server obtains all candidate keywords that may be keywords in the target text and obtains the candidate keyword set in the target text, and then the server further screens the candidate keyword set, and a specific process is as follows:

The server obtains the candidate keyword set in the target text, then determines the extraction degree of the keyword in the keyword set at least according to the subject similarity and the text conversion frequency of the candidate keyword in the candidate keyword set, the subject similarity being similarity between the candidate keyword and the target text, and the extraction degree being used for indicating the probability at which the candidate keyword used as the keyword matching the target text is extracted, and extracts the keyword from the candidate keyword set according to the extraction degree. The extraction degree of the candidate keyword is determined according to at least one or any one of the subject similarity between the candidate keyword and the target text and the text conversion frequency of the candidate keyword. However, to improve accuracy of the keyword, the extraction degree of the candidate word is determined by using both the subject similarity and the text conversion frequency, to resolve a problem that a keyword extraction condition is excessively broad.

Optionally, after the server extracts the keyword from the candidate keyword set according to the extraction degree, the method further includes at least one of the following:

1) matching, by the server, a text label for the target text according to the extracted keyword, the text label being used for identifying classification information of the target text, and pushing, by the server, the target text to a matching user account according to the text label; and 2) matching, by the server according to the extracted keyword, an account label for the target account obtaining the target text, the account label being used for identifying classification information of the target account, and pushing, by the server, a matching text to the target account according to the account label.

In the first solution, the server uses the extracted keyword of the target text to match the text label for the target text, to distinguish category information of the target text. Then, the server pushes the target text to the matching user account according to the text label, and may also classify and store the target text according to the text label, and the like.

In the second solution, the server uses the extracted keyword of the target text to match the account label for the target account of the target text, and the account label is used for identifying the classification information of the target account. The server pushes a matching text to the target account according to the account label, classifies and marks the target account according to the account label, or the like, to subsequently perform a related service on the target account according to the account label.

Optionally, the determining, by the server, an extraction degree of the keyword in the keyword set at least according to subject similarity and a text conversion frequency of a candidate keyword in the candidate keyword set includes but is not limited to: obtaining, by the server, the subject similarity of the candidate keyword and a weighting result of the text conversion frequency of the candidate keyword; obtaining attribute information of the candidate keyword, the attribute information including a part of speech of the candidate keyword and a word frequency of the candidate keyword in the target text; and determining, by the server, the extraction degree according to the weighting result and the attribute information.

For example, when a target text is obtained, the server first determines a subject in the target text, then screens the candidate keyword set of the target text, and obtains the weighting result of the candidate keyword according to the subject similarity of the candidate keyword and the text conversion frequency, to obtain a probability at which the candidate keyword is a keyword. In addition, in the attribute information of the obtained candidate keyword, the part of speech includes but is not limited to a verb, a noun, an adjective, or the like. The word frequency of the candidate keyword in the target text is a quantity of times of occurrence of the candidate keyword in the target text. After obtaining the foregoing information, the server determines the extraction degree of the candidate keyword according to the weighting result and the attribute information.

Optionally, the determining, by the server, the extraction degree according to the weighting result and the attribute information includes but is not limited to: determining, by the server, an extraction coefficient of the candidate keyword according to the part of speech of the candidate keyword and a location of the candidate keyword in the target text; and obtaining, by the server, a product of the extraction coefficient, the word frequency, and the weighting result as the extraction degree, a sum of a first weight matching the subject similarity and a second weight matching the text conversion frequency in the weighting result being 1.

In an actual application scenario, in data of a target text, the extraction degree of the candidate keyword is usually determined based on two evaluation parameters: the subject similarity of the candidate keyword and the conversion frequency of the candidate keyword. In this way, the sum of a value of the first weight of the subject similarity of the candidate keyword and a value of the second weight matching the text conversion frequency is 1.

In this embodiment, the subject similarity and the text conversion frequency are regarded as evaluation parameters of using the candidate keyword as the keyword. When there is another evaluation parameter in addition to the evaluation parameters (the subject similarity and the candidate keyword), a sum of values of weights of a plurality of evaluation parameters herein is 1. This is not limited in this embodiment.

Optionally, the determining, by the server, an extraction coefficient of the candidate keyword according to the part of speech of the candidate keyword and a location of the candidate keyword in the target text includes but is not limited to:

1) determining, by the server, that the extraction coefficient is greater than a part-of-speech coefficient matching the part of speech in a case that the candidate keyword appears in a title corresponding to the target text; and 2) determining, by the server, that the extraction coefficient is equal to the part-of-speech coefficient matching the part of speech in a case that the candidate keyword does not appear in a title corresponding to the target text.

A value of the part-of-speech coefficient is determined according to the part of speech of the candidate keyword, which specifically includes the following several cases:

a) The part-of-speech coefficient is a first value in a case that the part of speech is a noun.

b) The part-of-speech coefficient is a second value in a case that the part of speech is a verb.

c) The part-of-speech coefficient is a third value in a case that the part of speech is a word of another part of speech.

Optionally, before the determining, by the server, an extraction degree of the keyword in the keyword set at least according to subject similarity and a text conversion frequency of a candidate keyword in the candidate keyword set, the method further includes but is not limited to: obtaining, by the server, a total quantity of texts in a corpus in which the target text is located and a first ratio of the total quantity of texts to a quantity of texts including the candidate keyword in the corpus; obtaining, by the server, a total quantity of search entries in a preset search platform and a quantity of search entries including the candidate keyword in the preset search platform; determining a second ratio of the quantity of search entries to the total quantity of search entries according to the quantity of search entries and the total quantity of search entries; and performing, by the server, logarithm computing on a product of the first ratio and the second ratio, to obtain the text conversion frequency of the candidate keyword.

In a specific application scenario, in a process that the server obtains the keyword of the target text, an existing corpus is usually combined and search data is cited to assist extract the keyword. A historical proportion of the candidate keyword in the corpus is determined by using a quantity of all texts locally stored or stored in a cloud corpus and the first ratio of the quantity of texts including the candidate keyword. On the other hand, the server determines a historical proportion of the candidate search keyword in the quantity of search entries by using the second ratio of the total quantity of search entries in the search data to a quantity of search entries including the search keyword. The server performs logarithm computing on the product of the first ratio and the second ratio, to obtain the text conversion frequency of the candidate keyword and improves the text conversion frequency, so that the text conversion frequency is more accurate. The existing corpus alone or the search data alone may also be cited herein. This is only an example.

Optionally, before the determining, by the server, an extraction degree of the keyword in the keyword set at least according to subject similarity and a text conversion frequency of a candidate keyword in the candidate keyword set further includes but is not limited to: obtaining, by the server, first subject distribution data matching the candidate keyword, the first subject distribution data being used for indicating a probability at which the candidate keyword is a kth subject in K subjects; obtaining, by the server, second subject distribution data matching the target text, the second subject distribution data being used for indicating a probability at which the target text is the kth subject in the K subjects; and determining the subject similarity between the candidate keyword and the target text according to the first subject distribution data and the second subject distribution data, the subject similarity being used for indicating a probability at which the candidate keyword is the kth subject, and the target text is also the kth subject in the K subjects, k being greater than or equal to 1 and less than or equal to K.

In this embodiment of this application, a server obtains a candidate keyword set in a target text, and then determines an extraction degree of the keyword in the keyword set according to subject similarity and a text conversion frequency of a candidate keyword in the candidate keyword set is used, the subject similarity being similarity between the candidate keyword and the target text, to extract the keyword from the candidate keyword set by using the extraction degree, to combine at least two dimensions of the text conversion frequency of the candidate keyword and the subject similarity of the target text, to determine a to-be-extracted keyword in the target text, rather than performing broad keyword extraction based on statistical data, thereby improving keyword extraction accuracy.

In an optional solution, the determining, by the server, an extraction degree of the keyword in the keyword set according to subject similarity and a text conversion frequency of a candidate keyword in the candidate keyword set includes:

S1, obtaining, by the server, the subject similarity of the candidate keyword and a weighting result of the text conversion frequency of the candidate keyword;

S2, obtaining, by the server, attribute information of the candidate keyword, the attribute information comprising a part of speech of the candidate keyword and a word frequency of the candidate keyword in the target text; and S3, determining, by the server, the extraction degree according to the weighting result and the attribute information.

In a specific application scenario, when obtaining a target text, the server first obtains the candidate keyword set of the target text, and obtains the weighting result of the candidate keyword according to the subject similarity of the candidate keyword and the text conversion frequency IDF, to obtain a probability at which the candidate keyword is the keyword. In addition, in the attribute information of the obtained candidate keyword, the part of speech includes whether the candidate keyword is a verb, a noun, or an adjective, a language (such as Chinese, English, and Japanese) of the keyword, and the like. The word frequency of the candidate keyword in the target text is times or frequency of occurrence of the candidate keyword in the target text. After obtaining the foregoing information, the server determines the extraction degree of the candidate keyword according to the weighting result and the attribute information.

In this embodiment, the server obtains the subject similarity of the candidate keyword and a weighting result of the text conversion frequency of the candidate keyword and determines the extraction degree of the candidate keyword according to the weighting result and the attribute information of the candidate keyword, resolving a problem that a keyword extraction condition is broad.

In an optional solution, the determining, by the server, the extraction degree according to the weighting result and the attribute information includes:

S1, determining, by the server, an extraction coefficient of the candidate keyword according to the part of speech of the candidate keyword and a location of the candidate keyword in the target text; and S2, obtaining, by the server, a product of the extraction coefficient, the word frequency, and the weighting result as the extraction degree, a sum of a first weight matching the subject similarity and a second weight matching the text conversion frequency in the weighting result being 1.

In a specific application scenario, in data of a target text, the extraction degree of the candidate keyword is usually determined based on two evaluation parameters: the subject similarity of the candidate keyword and the text conversion frequency of the candidate keyword. In this way, the sum of the value of the first weight of the subject similarity of the candidate keyword and the value of the second weight matching the text conversion frequency is 1. When there are evaluation parameters of a plurality of candidate keywords, for example, when there is a plurality of other evaluation parameters, a sum of values of weights of the plurality of evaluation parameters of the candidate keyword is 1.

In addition, the extraction degree of the candidate keyword is determined according to the weighting result and the attribute information, and the extraction coefficient of the candidate keyword is determined according to the part of speech of the candidate keyword and the location of the candidate keyword in the target text. The location of the candidate keyword in the target text includes but is not limited to whether the candidate keyword is in a title of the target text. Then, the product of the extraction coefficient, the word frequency, and the weighting result is used as the extraction degree of the candidate keyword.

For example, assuming that w is the candidate keyword, the extraction degree of w may be obtained through calculation according to the following manner:

$$\text{weight}_w = S_1 * tf * \{S_2 * IDF_w + (1-S_2) * T\}$$

$S_1$ is an extraction coefficient, tf is a word frequency of w, and $\{S_2 * IDF_w + (1-S_2) * T\}$ is a weighting result. $IDF_w$ is a text conversion frequency of the candidate keyword w, T is subject similarity, and $S_2$ is a parameter for adjusting $IDF_w$ and the subject similarity.

In this embodiment, the server determines an extraction coefficient of the candidate keyword according to the part of speech of the candidate keyword and a location of the candidate keyword in the target text and obtains a product of the extraction coefficient, the word frequency, and the weighting result as the extraction degree, thereby improving extraction accuracy of the keyword in the target text.

In an optional solution, the determining, by the server, an extraction coefficient of the candidate keyword according to the part of speech of the candidate keyword and a location of the candidate keyword in the target text includes:

S1, determining, by the server, that the extraction coefficient is greater than a part-of-speech coefficient matching the part of speech in a case that the candidate keyword appears in a title corresponding to the target text; and S2, determining, by the server, that the extraction coefficient is equal to the part-of-speech coefficient matching the part of speech in a case that the candidate keyword does not appear in a title corresponding to the target text.

In a specific application scenario, if the candidate keyword appears in the title corresponding to the target text, the server determines that the extraction coefficient of the candidate keyword is greater than the part-of-speech coefficient matching the part of speech; if the candidate keyword does not appear in the title corresponding to the target text, the server determines that the extraction coefficient of the candidate keyword is equal to the part-of-speech coefficient matching the part of speech.

The determining a value of the part-of-speech coefficient according to the part of speech of the candidate keyword includes:

A) The part-of-speech coefficient is a first value in a case that the part of speech is a noun.

B) The part-of-speech coefficient is a second value in a case that the part of speech is a verb.

C) The part-of-speech coefficient is a third value in a case that the part of speech is a word of another part of speech.

In a specific application scenario, different parts of speech of the candidate keyword affect part-of-speech coefficients thereof. Different parts of speech correspond to different part-of-speech systems. A specific value of the part-of-speech coefficient is set according to actual experience of the user and is not limited herein.

For example, assuming that in data of a group of target texts, w is the candidate keyword, a calculation manner of the extraction degree of the candidate keyword w is the formula as above: $\text{weight}_w = S_1 * tf * \{S_2 * IDF_w + (1-S_2) * T\}$. $S_2$ is a parameter for adjusting the text conversion frequency IDF of the candidate keyword and the subject similarity. The extraction coefficient $S_1$ is related to whether the part of speech of w appears in the title. If w appears in the title, $S_1 = 2S_0$, and $S_0$ is a part-of-speech coefficient of w. otherwise, $S_1 = S_0$.

$$S_0 = \begin{cases} 1 & w \text{ is a noun} \\ 0.8 & w \text{ is a verb} \\ 0.1 & \text{Other} \end{cases}$$

In this embodiment, the server determines a corresponding extraction coefficient and part-of-speech coefficient according to a location of the candidate keyword in the target text and the part of speech of the candidate keyword, to accurately extract the keyword in the target text.

In an optional solution, before the determining, by the server, an extraction degree of the keyword in the keyword set at least according to subject similarity and a text conversion frequency of a candidate keyword in the candidate keyword set, the method further includes:

S1, obtaining, by the server, a total quantity of texts in a corpus in which the target text is located and a first ratio of the total quantity of texts to a quantity of texts comprising the candidate keyword in the corpus;

S2, obtaining, by the server, a total quantity of search entries in a preset search platform and a quantity of search entries comprising the candidate keyword in the preset search platform;

S3, determining, by the server, a second ratio of the quantity of search entries to the total quantity of search entries according to the quantity of search entries and the total quantity of search entries; and S4, performing, by the server, logarithm computing on a product of the first ratio and the second ratio, to obtain the text conversion frequency of the candidate keyword.

In a specific application scenario, in a process that the server obtains the keyword of the target text, an existing corpus is usually combined and search data is cited to assist extract the keyword. The server determines a historical proportion of the candidate keyword in the corpus by using a quantity of all texts locally stored or stored in a cloud corpus and the first ratio of the quantity of texts including the candidate keyword. On the other hand, the server determines a historical proportion of the candidate search keyword in the quantity of search entries by using the second ratio of the total quantity of search entries in the search data to a quantity of search entries including the search keyword. The server performs logarithm computing on a product of the first ratio and the second ratio, to obtain the text conversion frequency of the candidate keyword.

Alternatively, the server performs logarithm computing on the first ratio by using only a quantity of all texts locally stored or stored in a cloud corpus and the first ratio of the quantity of texts including the candidate keyword, to obtain the text conversion frequency of the candidate keyword.

Alternatively, the server determines the historical proportion of the candidate search keyword in the quantity of search entries by using only the second ratio between the total quantity of search entries in the search data to a quantity of search entries including the search keyword and performs logarithm computing on the second ratio, to obtain the text conversion frequency of the candidate keyword.

The foregoing three manners are all improvements to the text conversion frequency of the candidate keyword and differ in that accuracy of the improved text conversion frequencies is slightly different.

Figure 3:
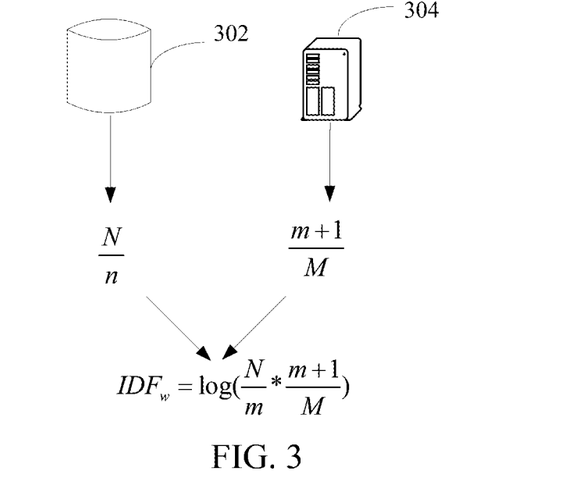
FIG. 3 is a schematic diagram of improving a text conversion frequency provided in an embodiment of this application.

The following describes the first manner. For example, a name "YM" of a character Y appears in an article. As shown in FIG. 3, data is separately obtained from a corpus 302 and a search database 304, to improve the text conversion frequency. The improved text conversion frequency IDF of the candidate keyword "YM" is as follows:

$$IDF_w = \log\left(\frac{N}{n} * \frac{m+1}{M}\right)$$

N represents a total quantity of files, and n presents a quantity of files of the word w. M represents a total quantity of search entries in the search data, and m represents a quantity of search entries including the candidate keyword "YM". m plus 1 is to prevent that m is 0.

In this embodiment, the server introduces the historical data and the search data, to improve the text conversion frequency, so that the text conversion frequency is more accurate.

In an optional solution, before the determining, by the server, an extraction degree of the keyword in the keyword set at least according to subject similarity and a text conversion frequency of a candidate keyword in the candidate keyword set, the method further includes:

S1, obtaining, by the server, first subject distribution data matching the candidate keyword, the first subject distribution data being used for indicating a probability at which the candidate keyword is a kth subject in K subjects;

S2, obtaining, by the server, second subject distribution data matching the target text, the second subject distribution data being used for indicating a probability at which the target text is the kth subject in the K subjects; and S3, determining, by the server, the subject similarity between the candidate keyword and the target text according to the first subject distribution data and the second subject distribution data, the subject similarity being used for indicating a probability at which the candidate keyword is the kth subject, and the target text is also the kth subject in the K subjects, k being greater than or equal to 1 and less than or equal to K.

In an optional implementation, the determining, by the server, the subject similarity between the candidate keyword and the target text according to the first subject distribution data and the second subject distribution data includes but is not limited to: determining, by the server, the subject similarity between the candidate keyword and the target text by using the following formula:

$$\cos(w; d) = \frac{\sum_{k=1}^{K} p(k|w) * P(k|d)}{\sqrt{\sum_{k=1}^{K} p(k|w) * P(k|w)} * \sqrt{\sum_{k=1}^{K} p(k|d) * P(k|d)}}$$

w is used for representing the candidate keyword, d is used for representing the target text, and cos(w; d) is used for representing the subject similarity between the candidate keyword and the target text. cos(w; d) has a same meaning as T in the foregoing formula weight$_w$=S$_1$*tf*{S$_2$*IDF$_w$+ (1−S$_2$)*T}. k is used for representing the kth subject in the K subjects, P(k|d) is used for representing a probability at which the target text is the kth subject, and p(k|w) is used for representing a probability at which the candidate keyword is the kth subject.

In this embodiment, the server calculates subject distribution of the candidate keyword and documents by using existing learned subject distribution data of the candidate keyword, to obtain the subject similarity between the keyword and the target text, thereby resolving a problem that a keyword extraction condition is excessively broad.

In an optional solution, after the keyword is extracted from the candidate keyword set according to the extraction degree, the method further includes at least one of the following:

S1, matching a text label for the target text according to the extracted keyword, the text label being used for identifying classification information of the target text, and pushing the target text to a matching user account according to the text label; and S2, matching, according to the extracted keyword, an account label for the target account obtaining the target text, the account label being used for identifying classification information of the target account, and pushing a matching text to the target account according to the account label.

Figure 4:
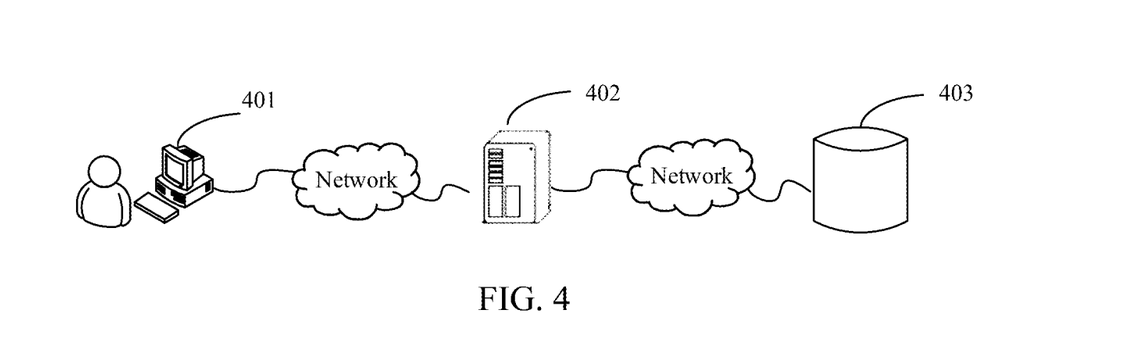
FIG. 4 is a schematic diagram of text label classification of a keyword according to an embodiment of this application.

In a specific application scenario, as shown in FIG. 4, an example in which the target text is a news text is used for description. Assuming that a terminal 401 is connected to an application server 402 through a network, the application server 402 matches a text label "military" for a news text according to a candidate keyword obtained from the news text sent by the terminal 401 and depending on that keywords finally extracted from a corpus 403 are "aircraft carrier" and "military". It indicates that the news is military news, and then the news is pushed to a user account matching the terminal 401 according to the label of the news text.

Figure 5:
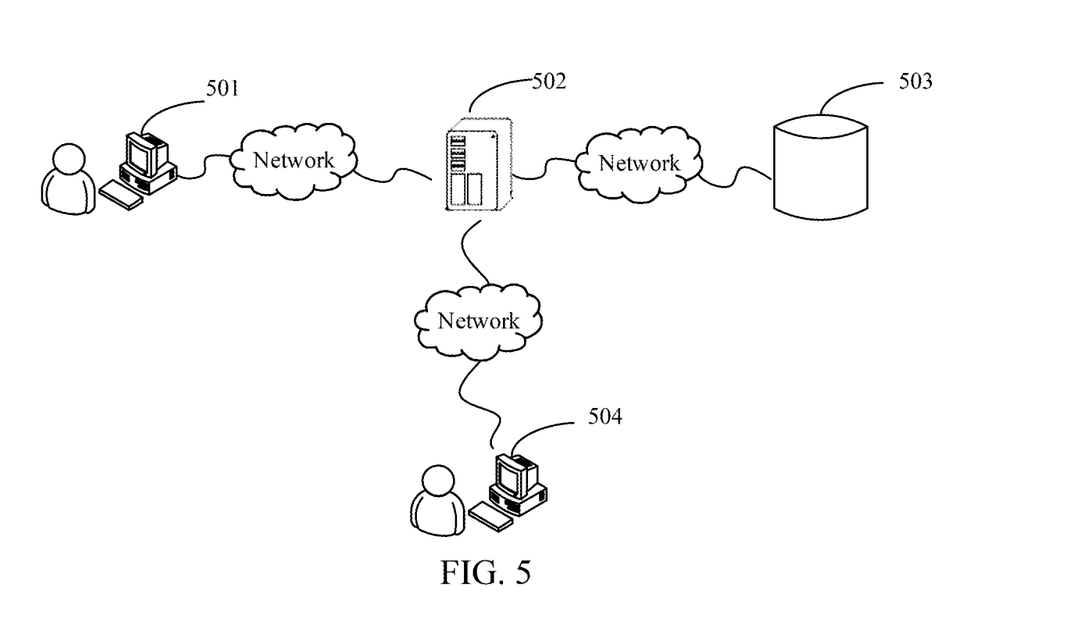
FIG. 5 is a schematic diagram of account label classification of a keyword according to an embodiment of this application.

The example in which the target text is a news text is still used for description. As shown in FIG. 5, assuming that the terminal 501 is connected to the application server 502 through the network. According to the candidate keyword obtained from the news text sent by the terminal 501 and depending on that the keywords finally extracted from the corpus 503 are "aircraft carrier" and "military", the application server 502 matches an account label "user A" for the target text if the user A notices this kind of news, and a terminal at which the user A is located is the terminal 504, pushes a matching news text to a target account of the user A according to the "user A" account label, and sends the news text to the terminal 504.

In this embodiment, the extracted target text keyword is used for text label classification and account label classification, to improve accuracy of target text pushing.

For simple descriptions, the foregoing method embodiments are stated as a series of action combinations. However, a person skilled in the art should know that this application is not limited to the sequence of the described actions because according to this application, some steps may use another sequence or may be simultaneously performed. Secondarily, a person skilled in the art should know that the embodiments described in the specification all belong to optional embodiments and the actions and modules are not necessary for this application.

Figure 6:
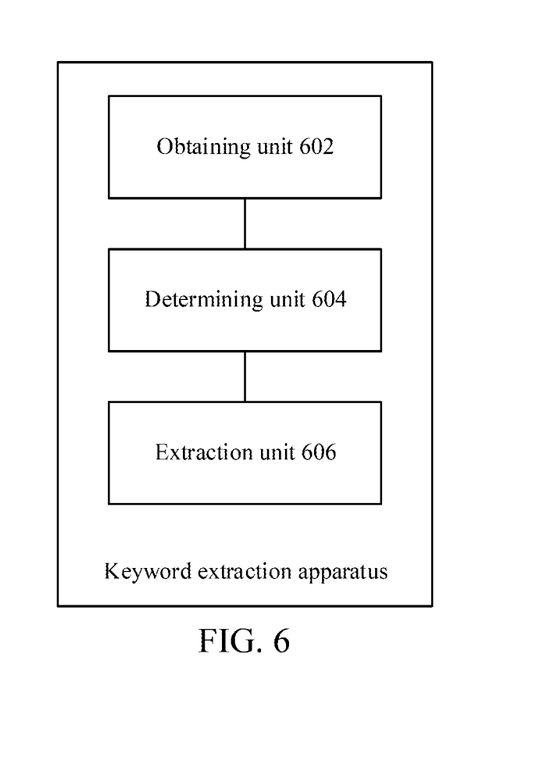
FIG. 6 is a schematic structural diagram of a keyword extraction apparatus according to an embodiment of this application.

The embodiments of this application further provide a keyword extraction apparatus for implementing the keyword extraction method. The keyword extraction apparatus can include processing circuitry configured to implement one or more of the various units and can be applied to a server. As shown in FIG. 6, the apparatus includes:

1) an obtaining unit 602, configured to obtain a candidate keyword set in a target text;

2) a determining unit 604, configured to determine an extraction degree of the candidate keyword at least according to subject similarity and a text conversion frequency of a candidate keyword in the candidate keyword set, the subject similarity being similarity between the candidate keyword and the target text, and the extraction degree being used for indicating a probability at which the candidate keyword used as a keyword matching the target text is extracted; and 3) an extraction unit 606, configured to extract the keyword from the candidate keyword set according to the extraction degree.

The application scenario in the technical solutions of the embodiments of this application includes but is not limited to: an electronic terminal, a server, or the like, which is configured to obtain the keyword in the target text, retrieve a target keyword, or the like, and may be specifically used in an application scenario such as advertisement pushing, news pushing, and other message notification subscribed by a user. The foregoing application scenario is only an example. This is not limited in this embodiment.

Optionally, in a process of obtaining the keyword, first all candidate keywords that may be keywords in the target text are obtained, the candidate keyword set in the target text is obtained, and then the candidate keyword set is further screened, and a specific process is as follows:

The candidate keyword set in the target text is obtained, then the extraction degree of the candidate keyword is determined at least according to the subject similarity and the text conversion frequency of the candidate keyword in the candidate keyword set, the subject similarity being similarity between the candidate keyword and the target text, and the extraction degree being used for indicating the probability at which the candidate keyword used as the keyword matching the target text is extracted, and extracts the keyword from the candidate keyword set according to the extraction degree. The extraction degree of the candidate keyword is determined according to at least one or any one of the subject similarity between the candidate keyword and the target text and the text conversion frequency of the candidate keyword. However, to improve accuracy of the keyword, the extraction degree of the candidate word is determined by using both the subject similarity and the text conversion frequency, to resolve a problem that a keyword extraction condition is excessively broad.

Optionally, after the keyword is extracted from the candidate keyword set according to the extraction degree, the method further includes at least one of the following:

1) matching a text label for the target text according to the extracted keyword, the text label being used for identifying classification information of the target text, and pushing the target text to a matching user account according to the text label; and 2) matching, according to the extracted keyword, an account label for the target account obtaining the target text, the account label being used for identifying classification information of the target account, and pushing a matching text to the target account according to the account label.

In the first solution, the extracted keyword of the target text is used to match the text label for the target text, to distinguish category information of the target text. Then, the target text is pushed to the matching user account according to the text label, and the target text may also be classified and stored according to the text label, and the like.

In the second solution, the extracted keyword of the target text is used to match the account label for the target account of the target text, and the account label is used for identifying the classification information of the target account. A matching text is pushed to the target account according to the account label, the target account is classified and marked according to the account label, or the like, to subsequently perform a related service on the target account according to the account label.

Optionally, the determining an extraction degree of the keyword in the keyword set at least according to subject similarity and a text conversion frequency of a candidate keyword in the candidate keyword set includes but is not limited to: obtaining the subject similarity of the candidate keyword and a weighting result of the text conversion frequency of the candidate keyword; obtaining attribute information of the candidate keyword, the attribute information including a part of speech of the candidate keyword and a word frequency of the candidate keyword in the target text; and determining the extraction degree according to the weighting result and the attribute information. For example, when a target text is obtained, a subject in the target text is first determined, then the candidate keyword set of the target text is screened, and the weighting result of the candidate keyword is obtained according to the subject similarity of the candidate keyword and the text conversion frequency, to obtain a probability at which the candidate keyword is a keyword. In addition, in the attribute information of the obtained candidate keyword, the part of speech includes but is not limited to a verb, a noun, an adjective, or the like. The word frequency of the candidate keyword in the target text is a quantity of times of occurrence of the candidate keyword in the target text. After the foregoing information is obtained, the extraction degree of the candidate keyword is determined according to the weighting result and the attribute information.

Optionally, the determining the extraction degree according to the weighting result and the attribute information includes but is not limited to: determining an extraction coefficient of the candidate keyword according to the part of speech of the candidate keyword and a location of the candidate keyword in the target text; and obtaining a product of the extraction coefficient, the word frequency, and the weighting result as the extraction degree, a sum of a first weight matching the subject similarity and a second weight matching the text conversion frequency in the weighting result being 1. In an actual application scenario, in data of a target text, the extraction degree of the candidate keyword is usually determined based on two evaluation parameters: the subject similarity of the candidate keyword and the conversion frequency of the candidate keyword. In this way, the sum of a value of the first weight of the subject similarity of the candidate keyword and a value of the second weight matching the text conversion frequency is 1.

In this embodiment, the subject similarity and the text conversion frequency are regarded as evaluation parameters of using the candidate keyword as the keyword. When there is another evaluation parameter in addition to the evaluation parameters (the subject similarity and the candidate keyword), a sum of values of weights of a plurality of evaluation parameters herein is 1. This is not limited in this embodiment.

Optionally, the determining an extraction coefficient of the candidate keyword according to the part of speech of the candidate keyword and a location of the candidate keyword in the target text includes but is not limited to:

1) determining that the extraction coefficient is greater than a part-of-speech coefficient matching the part of speech in a case that the candidate keyword appears in a title corresponding to the target text; and 2) determining that the extraction coefficient is equal to the part-of-speech coefficient matching the part of speech in a case that the candidate keyword does not appear in a title corresponding to the target text.

A value of the part-of-speech coefficient is determined according to the part of speech of the candidate keyword, which specifically includes the following several cases:

a) The part-of-speech coefficient is a first value in a case that the part of speech is a noun.

b) The part-of-speech coefficient is a second value in a case that the part of speech is a verb.

c) The part-of-speech coefficient is a third value in a case that the part of speech is a word of another part of speech.

Optionally, before the determining an extraction degree of the keyword in the keyword set at least according to subject similarity and a text conversion frequency of a candidate keyword in the candidate keyword set, the method further includes but is not limited to: obtaining a total quantity of texts in a corpus in which the target text is located and a first ratio of the total quantity of texts to a quantity of texts including the candidate keyword in the corpus; obtaining a total quantity of search entries in a preset search platform and a quantity of search entries including the candidate keyword in the preset search platform; determining a second ratio of the quantity of search entries to the total quantity of search entries according to the quantity of search entries and the total quantity of search entries; and performing logarithm computing on a product of the first ratio and the second ratio, to obtain the text conversion frequency of the candidate keyword.

In a specific application scenario, in a process of obtaining the keyword of the target text, an existing corpus is usually combined and search data is cited to assist extract the keyword. A historical proportion of the candidate keyword in the corpus is determined by using a quantity of all texts locally stored or stored in a cloud corpus and the first ratio of the quantity of texts including the candidate keyword. On the other hand, a historical proportion of the candidate search keyword in the quantity of search entries is determined by using the second ratio of the total quantity of search entries in the search data to a quantity of search entries including the search keyword. Logarithm computing is performed on the product of the first ratio and the second ratio, to obtain the text conversion frequency of the candidate keyword and improves the text conversion frequency, so that the text conversion frequency is more accurate. The existing corpus alone or the search data alone may also be cited herein. This is only an example.

Optionally, before the determining an extraction degree of the keyword in the keyword set at least according to subject similarity and a text conversion frequency of a candidate keyword in the candidate keyword set further includes but is not limited to: obtaining first subject distribution data matching the candidate keyword, the first subject distribution data being used for indicating a probability at which the candidate keyword is a kth subject in K subjects; obtaining second subject distribution data matching the target text, the second subject distribution data being used for indicating a probability at which the target text is the kth subject in the K subjects; and determining the subject similarity between the candidate keyword and the target text according to the first subject distribution data and the second subject distribution data, the subject similarity being used for indicating a probability at which the candidate keyword is the kth subject, and the target text is also the kth subject in the K subjects, k being greater than or equal to 1 and less than or equal to K.

In this embodiment of this application, a candidate keyword set in a target text is obtained, and then an extraction degree of the keyword in the keyword set is determined according to subject similarity and a text conversion frequency of a candidate keyword in the candidate keyword set is used, the subject similarity being similarity between the candidate keyword and the target text, to extract the keyword from the candidate keyword set by using the extraction degree, to combine at least two dimensions of the text conversion frequency of the candidate keyword and the subject similarity of the target text, to determine a to-be-extracted keyword in the target text, rather than performing broad keyword extraction based on statistical data, thereby improving keyword extraction accuracy.

In an optional technical solution, the determining unit 604 includes:

1) a first obtaining module, configured to obtain the subject similarity of the candidate keyword and a weighting result of the text conversion frequency of the candidate keyword;

2) a second obtaining module, configured to obtain attribute information of the candidate keyword, the attribute information comprising a part of speech of the candidate keyword and a word frequency of the candidate keyword in the target text; and 3) a first determining module, configured to determine the extraction degree according to the weighting result and the attribute information.

In a specific application scenario, when a target text is obtained, the candidate keyword set of the target text is first obtained, and the weighting result of the candidate keyword is obtained according to the subject similarity of the candidate keyword and the text conversion frequency IDF, to obtain a probability at which the candidate keyword is the keyword. In addition, in the attribute information of the obtained candidate keyword, the part of speech includes whether the candidate keyword is a verb, a noun, or an adjective, a language (such as Chinese, English, and Japanese) of the keyword, and the like. The word frequency of the candidate keyword in the target text is times or frequency of occurrence of the candidate keyword in the target text. After the foregoing information is obtained, the extraction degree of the candidate keyword is determined according to the weighting result and the attribute information.

In this embodiment, the subject similarity of the candidate keyword and a weighting result of the text conversion frequency of the candidate keyword are obtained, and the extraction degree of the candidate keyword is determined according to the weighting result and the attribute information of the candidate keyword, resolving a problem that a keyword extraction condition is broad.

In an optional technical solution, the first determining module includes:

1) a first determining sub-module, configured to determine an extraction coefficient of the candidate keyword according to the part of speech of the candidate keyword and a location of the candidate keyword in the target text; and 2) a first obtaining sub-module, configured to obtain a product of the extraction coefficient, the word frequency, and the weighting result as the extraction degree, a sum of a first weight matching the subject similarity and a second weight matching the text conversion frequency in the weighting result being 1.

In a specific application scenario, in data of a target text, the extraction degree of the candidate keyword is usually determined based on two evaluation parameters: the subject similarity of the candidate keyword and the text conversion frequency of the candidate keyword. In this way, the sum of the value of the first weight of the subject similarity of the candidate keyword and the value of the second weight matching the text conversion frequency is 1. When there are evaluation parameters of a plurality of candidate keywords, for example, when there is a plurality of other evaluation parameters, a sum of values of weights of the plurality of evaluation parameters of the candidate keyword is 1.

In addition, the extraction degree of the candidate keyword is determined according to the weighting result and the attribute information, and the extraction coefficient of the candidate keyword is determined according to the part of speech of the candidate keyword and the location of the candidate keyword in the target text. The location of the candidate keyword in the target text includes but is not limited to whether the candidate keyword is in a title of the target text. Then, the product of the extraction coefficient, the word frequency, and the weighting result is used as the extraction degree of the candidate keyword. For example, assuming that w is the candidate keyword, the extraction degree of w may be obtained through calculation according to the following manner:

$$weight_w = S_1 * tf * \{S_2 * IDF_w + (1-S_2)*T\}$$

$S_1$ is an extraction coefficient, tf is a word frequency of w, and $\{S_2*IDF_w+(1-S_2)*T\}$ is a weighting result. $IDF_w$ is a text conversion frequency of the candidate keyword w, T is subject similarity, and $S_2$ is a parameter for adjusting $IDF_w$ and the subject similarity.

In this embodiment, an extraction coefficient of the candidate keyword is determined according to the part of speech of the candidate keyword and a location of the candidate keyword in the target text, and a product of the extraction coefficient, the word frequency, and the weighting result is obtained as the extraction degree, thereby improving extraction accuracy of the keyword in the target text.

In an optional technical solution, the first determining sub-module includes:

1) a second determining sub-module, configured to determine that the extraction coefficient is greater than a part-of-speech coefficient matching the part of speech in a case that the candidate keyword appears in a title corresponding to the target text; and 2) a third determining sub-module, configured to determine that the extraction coefficient is equal to the part-of-speech coefficient matching the part of speech in a case that the candidate keyword does not appear in the title corresponding to the target text.

In a specific application scenario, if the candidate keyword appears in the title corresponding to the target text, it is determined that the extraction coefficient of the candidate keyword is greater than the part-of-speech coefficient matching the part of speech; if the candidate keyword does not appear in the title corresponding to the target text, it is determined that the extraction coefficient of the candidate keyword is equal to the part-of-speech coefficient matching the part of speech.

The determining a value of the part-of-speech coefficient according to the part of speech of the candidate keyword includes:

A) The part-of-speech coefficient is a first value in a case that the part of speech is a noun.

B) The part-of-speech coefficient is a second value in a case that the part of speech is a verb.

C) The part-of-speech coefficient is a third value in a case that the part of speech is a word of another part of speech.

In a specific application scenario, different parts of speech of the candidate keyword affect part-of-speech coefficients thereof. Different parts of speech correspond to different part-of-speech systems. A specific value of the part-of-speech coefficient is set according to actual experience of the user and is not limited herein.

For example, assuming that in data of a group of target texts, w is the candidate keyword, a calculation manner of the extraction degree of the candidate keyword w is the formula as above: $weight_w = S_1*tf*\{S_2*IDF_w+(1-S_2)*T\}$. $S_2$ is a parameter for adjusting the text conversion frequency IDF of the candidate keyword and the subject similarity. The extraction coefficient $S_1$ is related to whether the part of speech of w appears in the title. If w appears in the title, $S_1=2S_0$, and $S_0$ is a part-of-speech coefficient of w. otherwise, $S_1=S_0$.

$$S_0 = \begin{cases} 1 & w \text{ is a noun} \\ 0.8 & w \text{ is a verb} \\ 0.1 & \text{Other} \end{cases}$$

In this embodiment, a corresponding extraction coefficient and part-of-speech coefficient are determined according to a location of the candidate keyword in the target text and the part of speech of the candidate keyword, to accurately extract the keyword in the target text.

In an optional technical solution, the determining unit 604 further includes:

1) a third obtaining module, configured to obtain, before the extraction degree of the keyword in the keyword set is determined at least according to the subject similarity and the text conversion frequency of the candidate keyword in the candidate keyword set, a total quantity of texts in a corpus in which the target text is located and a first ratio of the total quantity of texts to a quantity of texts comprising the candidate keyword in the corpus;

2) a fourth obtaining module, configured to obtain a total quantity of search entries in a preset search platform and a quantity of search entries including the candidate keyword in the preset search platform;

3) a second determining module, configured to determine a second ratio of the quantity of search entries to the total quantity of search entries according to the quantity of search entries and the total quantity of search entries; and 4) a third determining module, configured to perform logarithm computing on a product of the first ratio and the second ratio, to obtain the text conversion frequency of the candidate keyword.

In a specific application scenario, in a process of obtaining the keyword of the target text, an existing corpus is usually combined and search data is cited to assist extract the keyword. A historical proportion of the candidate keyword in the corpus is determined by using a quantity of all texts locally stored or stored in a cloud corpus and the first ratio of the quantity of texts including the candidate keyword. On the other hand, a historical proportion of the candidate search keyword in the quantity of search entries is determined by using the second ratio of the total quantity of search entries in the search data to a quantity of search entries including the search keyword. Logarithm computing is performed on a product of the first ratio and the second ratio, to obtain the text conversion frequency of the candidate keyword.

Alternatively, logarithm computing is performed on the first ratio by using only a quantity of all texts locally stored or stored in a cloud corpus and the first ratio of the quantity of texts including the candidate keyword, to obtain the text conversion frequency of the candidate keyword.

Alternatively, the historical proportion of the candidate search keyword in the quantity of search entries is determined by using only the second ratio between the total quantity of search entries in the search data to a quantity of search entries including the search keyword and performs logarithm computing on the second ratio, to obtain the text conversion frequency of the candidate keyword.

The foregoing three manners are all improvements to the text conversion frequency of the candidate keyword and differ in that accuracy of the improved text conversion frequencies is slightly different.

The following describes the first manner. For example, a name "YM" of a character Y appears in an article. As shown in FIG. 3, data is separately obtained from a corpus 302 and a search database 304, to improve the text conversion frequency. The improved text conversion frequency IDF of the candidate keyword "YM" is as follows:

$$IDF_w = \log\left(\frac{N}{n} * \frac{m+1}{M}\right)$$

N represents a total quantity of files, and n presents a quantity of files of the word w. M represents a total quantity of search entries in the search data, and m represents a quantity of search entries including the candidate keyword "YM". m plus 1 is to prevent that m is 0.

In this embodiment, the historical data and the search data are introduced, to improve the text conversion frequency, so that the text conversion frequency is more accurate.

In an optional technical solution, the determining unit 604 further includes:

a fifth obtaining module, configured to obtain, before the extraction degree of the keyword in the keyword set is determined at least according to the subject similarity and the text conversion frequency of the candidate keyword in the candidate keyword set, first subject distribution data matching the candidate keyword, the first subject distribution data being used for indicating a probability at which the candidate keyword is a kth subject in K subjects;

a sixth obtaining module, configured to obtain second subject distribution data matching the target text, the second subject distribution data being used for indicating a probability at which the target text is the kth subject in the K subjects; and a fourth determining module, configured to determine the subject similarity between the candidate keyword and the target text according to the first subject distribution data and the second subject distribution data, the subject similarity being used for indicating a probability at which the candidate keyword is the kth subject, and the target text is also the kth subject in the K subjects, k being greater than or equal to 1 and less than or equal to K.

In an optional implementation, the determining the subject similarity between the candidate keyword and the target text according to the first subject distribution data and the second subject distribution data includes but is not limited to: determining the subject similarity between the candidate keyword and the target text by using the following formula:

$$\cos(w; d) = \frac{\sum_{k=1}^{K} p(k \mid w) * P(k \mid d)}{\sqrt{\sum_{k=1}^{K} p(k \mid w) * P(k \mid w)} * \sqrt{\sum_{k=1}^{K} p(k \mid d) * P(k \mid d)}}$$

w is used for representing the candidate keyword, d is used for representing the target text, and cos(w; d) is used for representing the subject similarity between the candidate keyword and the target text. cos(w; d) has a same meaning as T in the foregoing formula weight$_w$=S$_1$*tf*{S$_2$*IDF$_w$+ (1−S$_2$)*T}. k is used for representing the kth subject in the K subjects, P(k|d) is used for representing a probability at which the target text is the kth subject, and p(k|w) is used for representing a probability at which the candidate keyword is the kth subject.

In this embodiment, subject distribution of the candidate keyword and documents is calculated by using existing learned subject distribution data of the candidate keyword, to obtain the subject similarity between the keyword and the target text, thereby resolving a problem that a keyword extraction condition is excessively broad.

In an optional technical solution, after the extraction unit 606 extracts the keyword from the candidate keyword set according to the extraction degree, at least one of the following is further included:

a first pushing module, configured to match a text label for the target text according to the extracted keyword, the text label being used for identifying classification information of the target text, and pushing he target text to a matching user account according to the text label; and a second pushing module, configured to match, according to the extracted keyword, an account label for the target account obtaining the target text, the account label being used for identifying classification information of the target account, and pushing a matching text to the target account according to the account label.

In a specific application scenario, as shown in FIG. 4, an example in which the target text is a news text is used for description. Assuming that a terminal 401 is connected to an application server 402 through a network, the application server 402 matches a text label "military" for a news text according to a candidate keyword obtained from the news text sent by the terminal 401 and depending on that keywords finally extracted from a corpus 403 are "aircraft carrier" and "military". It indicates that the news is military news, and then the news is pushed to a user account matching the terminal 401 according to the label of the news text.

The example in which the target text is a news text is still used for description. As shown in FIG. 5, assuming that the terminal 501 is connected to the application server 502 through the network. According to the candidate keyword obtained from the news text sent by the terminal 501 and depending on that the keywords finally extracted from the corpus 503 are "aircraft carrier" and "military", the application server 502 matches an account label "user A" for the target text if the user A notices this kind of news, and a terminal at which the user A is located is the terminal 504, pushes a matching news text to a target account of the user A according to the "user A" account label, and sends the news text to the terminal 504.

In this embodiment, the extracted target text keyword is used for text label classification and account label classification, to improve accuracy of target text pushing.

Figure 7:
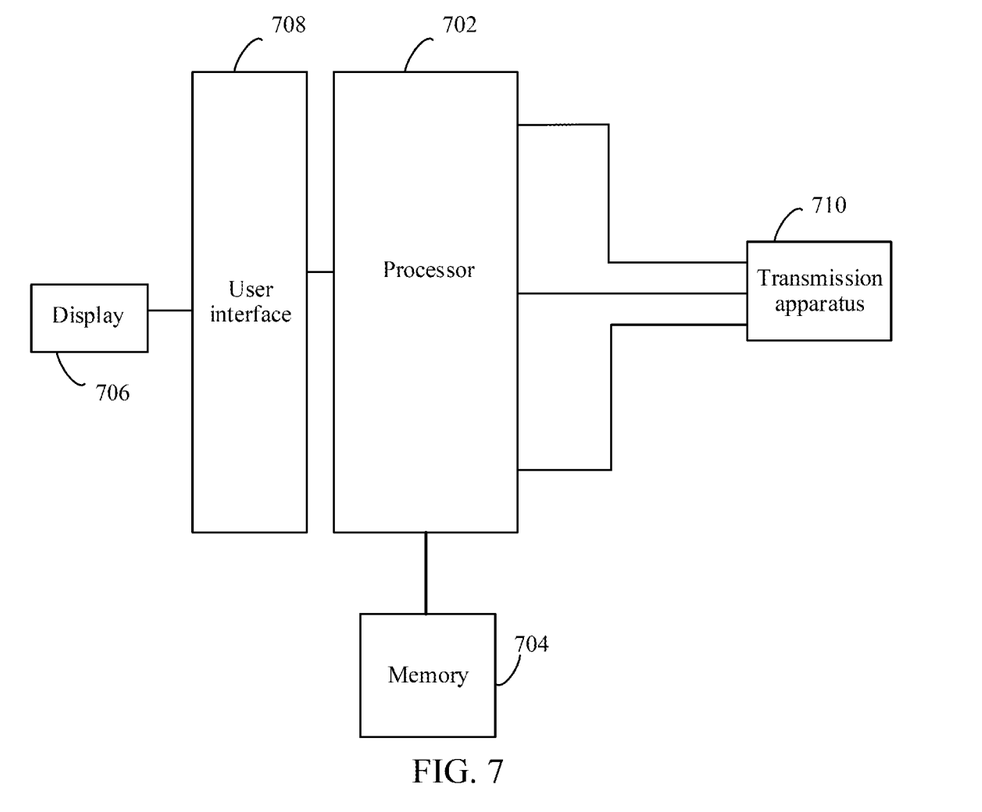
FIG. 7 is a structural schematic diagram of an electronic apparatus provided in an embodiment of this application.

The embodiments of this application further provide an electronic apparatus for implementing the keyword extraction method. As shown in FIG. 7, the electronic apparatus includes one or more (only one is shown in the figure) processors 702, a memory 704, a display 706, a user interface 708, and a transmission apparatus 710. The memory 704 may be configured to store a software program and module, for example, program instructions/modules corresponding to the keyword extraction method and apparatus in the embodiments of this application. The processor 702 runs the software program and module stored in the memory 704, to implement various functional application and data processing, that is, implement the keyword extraction method. The memory 704 may include a high-speed random memory, and may also include a nonvolatile memory such as one or more magnetic storage apparatuses, a flash memory, or another nonvolatile solid-state memory. In some embodiments, the memory 704 may further include memories remotely disposed relative to the processor 702, and these remote memories may be connected to the terminal A through a network. Examples of the network include but are not limited to, the Internet, an intranet, a local area network, a mobile communications network, and a combination thereof.

The foregoing transmission apparatus 710 is configured to receive or send data through a network. Specific examples of the foregoing network may include a wired network and a wireless network. In an embodiment, the transmission apparatus 710 includes a network interface controller (NIC) that may be connected to another network device and a router by using a network cable, thereby communicating with the Internet or a local area network. In an embodiment, the transmission apparatus 710 is a radio frequency (RF) module that is configured to communicate with the Internet in a wireless manner.

The memory 704 is configured to store information about a preset action condition and a preset privileged user, and an application.

Optionally, for a specific example in this embodiment, refer to the examples described in Embodiment 1 and Embodiment 2, and details are not described herein again in this embodiment.

Persons of ordinary skill in the art may understand that, the structure shown in FIG. 7 is only schematic. Alternatively, the electronic apparatus may be a terminal device such as a smartphone (such as an Android mobile phone or an iOS mobile phone), a tablet computer, a palmtop computer, a mobile Internet device (MID), or a PAD. FIG. 7 does not limit the structure of the foregoing electronic apparatus. For example, the electronic apparatus may further include more or fewer components (such as a network interface and a display apparatus) than those shown in FIG. 7, or have a configuration different from that shown in FIG. 7.

Persons of ordinary skill in the art may understand that all or some of the steps of the methods of the foregoing embodiments may be implemented by a program instructing relevant hardware of the terminal device. The program may be stored in a computer readable storage medium (e.g., a non-transitory computer-readable storage medium). The storage medium may be a flash disk, a read-only memory (ROM), a random access memory (RAM), a magnetic disk, or an optical disc.

According to another aspect, the embodiments of this application further provide a storage medium. Optionally, in this embodiment, the storage medium may be configured to store program code for performing the following steps:

S1, obtaining a candidate keyword set in a target text;

S2, determining an extraction degree of the candidate keyword at least according to subject similarity and a text conversion frequency of a candidate keyword in the candidate keyword set, the subject similarity being similarity between the candidate keyword and the target text, and the extraction degree being used for indicating a probability at which the candidate keyword used as a keyword matching the target text is extracted; and S3, extracting the keyword from the candidate keyword set according to the extraction degree.

Optionally, for a specific example in this embodiment, refer to the examples described in Embodiment 1 and Embodiment 2, and details are not described herein again in this embodiment.

Optionally, in this embodiment, the storage medium may include, but is not limited to: any medium that can store program code, such as a USB flash drive, a read only memory (ROM), a random access memory (RAM), a removable hard disk, a magnetic disk, or an optical disc.

The sequence numbers of the foregoing embodiments of this application are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such understanding, the technical solutions of this application essentially, or some contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, descriptions of the embodiments have different emphases, and as for parts that are not described in detail in one embodiment, reference can be made to the relevant descriptions of the other embodiments.

In the several embodiments provided in this application, it should be understood that the disclosed client may be implemented in other manners. For example, the described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The above descriptions are merely exemplary implementations of this application, and it should be noted that a person of ordinary skill in the art can make various improvements and refinements without departing from the spirit of this application. All such modifications and refinements should also be intended to be covered by this application.

INDUSTRIAL APPLICABILITY

In the embodiments of this application, a candidate keyword set in a target text is obtained, and then an extraction degree of the keyword in the keyword set is determined according to subject similarity and a text conversion frequency of a candidate keyword in the candidate keyword set is used, the subject similarity being similarity between the candidate keyword and the target text, to extract the keyword from the candidate keyword set by using the extraction degree, to combine at least two dimensions of the text conversion frequency of the candidate keyword and the subject similarity of the target text, to determine a to-be-extracted keyword in the target text, rather than performing broad keyword extraction based on statistical data, thereby improving keyword extraction accuracy.

What is claimed is:

1. A keyword extraction method, comprising:
   obtaining, by processing circuitry of a server, a candidate keyword set in a target text;
   determining, by the processing circuitry, an extraction degree of the candidate keyword based on subject similarity and a text conversion frequency of a candidate keyword in the candidate keyword set, the subject similarity being between the candidate keyword and the target text, and the extraction degree indicating a probability at which the candidate keyword used as a keyword matching the target text is extracted; and
   extracting, by the processing circuitry, the keyword from the candidate keyword set according to the extraction degree.

2. The method according to claim 1, wherein the determining comprises:
   obtaining, by the processing circuitry, the subject similarity of the candidate keyword and a weighting result of the text conversion frequency of the candidate keyword;
   obtaining, by the processing circuitry, attribute information of the candidate keyword, the attribute information including a part of speech of the candidate keyword and a word frequency of the candidate keyword in the target text; and
   determining, by the processing circuitry, the extraction degree according to the weighting result and the attribute information.

3. The method according to claim 2, wherein the determining comprises:
   determining, by the processing circuitry, an extraction coefficient of the candidate keyword according to the part of speech of the candidate keyword and a location of the candidate keyword in the target text; and
   obtaining, by the processing circuitry, a product of the extraction coefficient, the word frequency, and the weighting result as the extraction degree, a sum of a first weight matching the subject similarity and a second weight matching the text conversion frequency in the weighting result being 1.

4. The method according to claim 3, wherein
   the determining includes
      determining, by the processing circuitry, that the extraction coefficient is greater than a part-of-speech coefficient matching the part of speech in a case that the candidate keyword appears in a title corresponding to the target text; and
      determining, by the processing circuitry, that the extraction coefficient is equal to the part-of-speech coefficient matching the part of speech in a case that the candidate keyword does not appear in a title corresponding to the target text, and
   a value of the part-of-speech coefficient is determined according to the part of speech of the candidate keyword, the part-of-speech coefficient being a first value in a case that the part of speech is a noun, the part-of-speech coefficient being a second value in a case that the part of speech is a verb, and the part-of-speech coefficient being a third value in a case that the part of speech is a word of another part of speech.

5. The method according to claim 1, before the determining, further comprising:
   obtaining, by the processing circuitry, a total quantity of texts in a corpus in which the target text is located and a first ratio of the total quantity of texts to a quantity of texts including the candidate keyword in the corpus;
   obtaining, by the processing circuitry, a total quantity of search entries in a preset search platform and a quantity of search entries including the candidate keyword in the preset search platform;
   determining, by the processing circuitry, a second ratio of the quantity of search entries to the total quantity of search entries according to the quantity of search entries and the total quantity of search entries; and
   performing, by the processing circuitry, logarithm computing on a product of the first ratio and the second ratio, to obtain the text conversion frequency of the candidate keyword.

6. The method according to claim 1, before the determining, further comprising:
   obtaining, by the processing circuitry, first subject distribution data matching the candidate keyword, the first subject distribution data indicating a probability at which the candidate keyword is a kth subject in K subjects;
   obtaining, by the processing circuitry, second subject distribution data matching the target text, the second subject distribution data indicating a probability at which the target text is the kth subject in the K subjects; and determining, by the processing circuitry, the subject similarity between the candidate keyword and the target text according to the first subject distribution data and the second subject distribution data, the subject similarity indicating a probability at which the candidate keyword is the kth subject, and the target text is also the kth subject in the K subjects, k being greater than or equal to 1 and less than or equal to K.

7. The method according to claim 1, further comprising:
matching, by the processing circuitry, a text label for the target text according to the extracted keyword, the text label being used for identifying classification information of the target text, and pushing the target text to a matching user account according to the text label.

8. The method according to claim 1, further comprising:
matching, by the processing circuitry according to the extracted keyword, an account label for a target account obtaining the target text, the account label being used for identifying classification information of the target account, and pushing a matching text to the target account according to the account label.

9. A keyword extraction apparatus, comprising:
processing circuitry configured to
obtain a candidate keyword set in a target text;
determine an extraction degree of the candidate keyword based on subject similarity and a text conversion frequency of a candidate keyword in the candidate keyword set, the subject similarity being between the candidate keyword and the target text, and the extraction degree indicating a probability at which the candidate keyword used as a keyword matching the target text is extracted; and
extract the keyword from the candidate keyword set according to the extraction degree.

10. The apparatus according to claim 9, wherein the processing circuitry is configured to
obtain the subject similarity of the candidate keyword and a weighting result of the text conversion frequency of the candidate keyword;
obtain attribute information of the candidate keyword, the attribute information including a part of speech of the candidate keyword and a word frequency of the candidate keyword in the target text; and
determine the extraction degree according to the weighting result and the attribute information.

11. The apparatus according to claim 10, wherein the processing circuitry is configured to
determine an extraction coefficient of the candidate keyword according to the part of speech of the candidate keyword and a location of the candidate keyword in the target text; and
obtain a product of the extraction coefficient, the word frequency, and the weighting result as the extraction degree, a sum of a first weight matching the subject similarity and a second weight matching the text conversion frequency in the weighting result being 1.

12. The apparatus according to claim 11, wherein the processing circuitry is configured to
determine that the extraction coefficient is greater than a part-of-speech coefficient matching the part of speech in a case that the candidate keyword appears in a title corresponding to the target text; and
determine that the extraction coefficient is equal to the part-of-speech coefficient matching the part of speech in a case that the candidate keyword does not appear in a title corresponding to the target text, and
a value of the part-of-speech coefficient is determined according to the part of speech of the candidate keyword, the part-of-speech coefficient being a first value in a case that the part of speech is a noun, the part-of-speech coefficient being a second value in a case that the part of speech is a verb, and the part-of-speech coefficient being a third value in a case that the part of speech is a word of another part of speech.

13. The apparatus according to claim 9, wherein the processing circuitry is configured to
obtain, before the extraction degree of the candidate keyword is determined, a total quantity of texts in a corpus in which the target text is located and a first ratio of the total quantity of texts to a quantity of texts including the candidate keyword in the corpus;
obtain a total quantity of search entries in a preset search platform and a quantity of search entries including the candidate keyword in the preset search platform;
determine a second ratio of the quantity of search entries to the total quantity of search entries according to the quantity of search entries and the total quantity of search entries; and
perform logarithm computing on a product of the first ratio and the second ratio, to obtain the text conversion frequency of the candidate keyword.

14. The apparatus according to claim 9, wherein the processing circuitry is configured to
obtain, before the extraction degree of the candidate keyword is determined, first subject distribution data matching the candidate keyword, the first subject distribution data indicating a probability at which the candidate keyword is a kth subject in K subjects;
obtain second subject distribution data matching the target text, the second subject distribution data indicating a probability at which the target text is the kth subject in the K subjects; and
determine the subject similarity between the candidate keyword and the target text according to the first subject distribution data and the second subject distribution data, the subject similarity indicating a probability at which the candidate keyword is the kth subject, and the target text is also the kth subject in the K subjects, k being greater than or equal to 1 and less than or equal to K.

15. The apparatus according to claim 9, wherein the processing circuitry is configured to
match a text label for the target text according to the extracted keyword, the text label being used for identifying classification information of the target text, and pushing the target text to a matching user account according to the text label.

16. The apparatus according to claim 9, wherein the processing circuitry is configured to
match, according to the extracted keyword, an account label for a target account obtaining the target text, the account label being used for identifying classification information of the target account, and pushing a matching text to the target account according to the account label.

17. A non-transitory computer-readable storage medium storing instructions which when executed by a processor cause the processor to perform:
obtaining a candidate keyword set in a target text;
determining an extraction degree of the candidate keyword based on subject similarity and a text conversion frequency of a candidate keyword in the candidate keyword set, the subject similarity being between the candidate keyword and the target text, and the extraction degree indicating a probability at which the candidate keyword used as a keyword matching the target text is extracted; and extracting the keyword from the candidate keyword set according to the extraction degree.

18. The non-transitory computer-readable storage medium according to claim 17, wherein the determining comprises:

obtaining the subject similarity of the candidate keyword and a weighting result of the text conversion frequency of the candidate keyword;

obtaining attribute information of the candidate keyword, the attribute information including a part of speech of the candidate keyword and a word frequency of the candidate keyword in the target text; and determining the extraction degree according to the weighting result and the attribute information.

19. The non-transitory computer-readable storage medium according to claim 18, wherein the determining, the extraction degree comprises:

determining an extraction coefficient of the candidate keyword according to the part of speech of the candidate keyword and a location of the candidate keyword in the target text; and obtaining a product of the extraction coefficient, the word frequency, and the weighting result as the extraction degree, a sum of a first weight matching the subject similarity and a second weight matching the text conversion frequency in the weighting result being 1.

20. The non-transitory computer-readable storage medium according to claim 19, wherein the determining the extraction coefficient includes determining that the extraction coefficient is greater than a part-of-speech coefficient matching the part of speech in a case that the candidate keyword appears in a title corresponding to the target text; and determining that the extraction coefficient is equal to the part-of-speech coefficient matching the part of speech in a case that the candidate keyword does not appear in a title corresponding to the target text, and a value of the part-of-speech coefficient is determined according to the part of speech of the candidate keyword, the part-of-speech coefficient being a first value in a case that the part of speech is a noun, the part-of-speech coefficient being a second value in a case that the part of speech is a verb, and the part-of-speech coefficient being a third value in a case that the part of speech is a word of another part of speech.

* * * * *